United States Patent
Daniel et al.

(10) Patent No.: US 6,971,307 B2
(45) Date of Patent: Dec. 6, 2005

(54) WIDE APERTURE WIRE TRACKING WITH PARTITION

(75) Inventors: Barton Wade Daniel, Kennesaw, GA (US); Glenn F. Ellison, Lubbock, TX (US)

(73) Assignee: L&P Property Management Company, South Gate, CA (US)

( * ) Notice: Subject to any disclaimer, the term of this patent is extended or adjusted under 35 U.S.C. 154(b) by 63 days.

(21) Appl. No.: 10/722,278

(22) Filed: Nov. 25, 2003

(65) Prior Publication Data

US 2005/0109225 A1    May 26, 2005

(51) Int. Cl.⁷ .............................................. B65B 13/06
(52) U.S. Cl. ........................... 100/25; 53/589; 242/615
(58) Field of Search ............................... 100/11, 25, 26, 100/29; 53/587, 588, 589; 226/91, 196.1; 242/615

(56) References Cited

U.S. PATENT DOCUMENTS

| | | |
|---|---|---|
| 2,632,381 A | 3/1953 | Buckland |
| 2,780,986 A | 2/1957 | Ritenour |
| 3,470,813 A | 10/1969 | Nomm et al. |
| 3,477,363 A * | 11/1969 | Trumbo ........................ 100/34 |
| 3,691,939 A * | 9/1972 | Goodley ......................... 100/2 |
| 3,834,297 A | 9/1974 | Huson |
| 3,939,762 A | 2/1976 | Smitherman et al. |
| 4,403,542 A | 9/1983 | Lewis |
| 4,520,720 A | 6/1985 | Urban et al. |
| 4,826,499 A | 5/1989 | Ahr |
| 5,031,523 A | 7/1991 | Poloni |
| 5,826,499 A | 10/1998 | Bullington |
| 6,637,324 B2 * | 10/2003 | Stamps ........................ 100/26 |

* cited by examiner

Primary Examiner—Derris H. Banks
Assistant Examiner—Jimmy T. Nguyen
(74) Attorney, Agent, or Firm—Husch & Eppenberger, LLC; Grant D. Kang; Dennis J. M. Donahue, III (57) ABSTRACT

A guide track for a strap with which to bind a bale of bulk material. The guide track includes a convex portion and a restraining portion. Two lateral guide track halves are biased together. On their internal faces the guide track section halves have channels. The baling strap or baling wire is driven through the channels and guided around the material to be baled. The channels widen from a small diameter to a wide aperture at the receiving end of the guide track sections for receiving a lead end of a wire or strap that is propelled across a gap from a preceding guide track section. A partition is positioned within the wide aperture to provide multiple receptacles for the lead end of a wire or strap.

20 Claims, 9 Drawing Sheets

WIDE APERTURE WIRE TRACKING WITH PARTITION

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

1. Field of the Invention

This invention relates generally to a wide aperture with partition wire guide track for guiding baling wire around a bale of bulk fibrous material and a wire binding machine for baling bulk fibrous material that uses four sections of the wide aperture track.

2. Related Art

Wire baling of bulk materials has benefited from increased speed and reduced material cost through automation. Bulk materials include fibrous bulk materials such as cotton and nylon. Fibrous materials are commonly formed into bales by simultaneous compression and binding. There is a continuing need in the automated baling art to improve the efficiency, reliability and accuracy of the bale binding process.

Baling wire performance requirements vary depending upon the bulk material being baled. Such requirements range from industry standard specifications to general operational parameters, such as minimum speeds required for profitability. The Cotton Council issues baling constraint standards specifying particular ranges for the length of wire around the bale and the tension that the wire must withstand. These ranges correspond to the weight, volume and compression of various standard bale sizes such as "universal density" or "standard density" bales.

Current automated baling machines use an articulated track to guide wire around bales of bulk material, such as cotton, while the bale is under compression. Part of the wire guide track in current automated balers must be removable to a second position after the ends of the baling wire have been tied together, in order to allow ejection of the bale and insertion into the baling station of the next volume of material to be baled. Material to be baled is typically introduced into the automatic baler under vertical compression. Typical pressures for an industry standard 500 pound, 20×54 inch bale of cotton are in excess of 300 tons. Horizontal plates called follower blocks apply compression through platens which contact the surface of the cotton or other material being compressed. The platens incorporate slots which run lateral to the longitudinal axis of the bale. The Industry Standard number of binding wires for the most common kind of cotton bale, the standard density bale, is six. Accordingly there are six slots in the platens to allow the baling wire to be wrapped around the bale while it is still under compression. Under the lateral slots are lateral channels for insertion of wire guide track sections in both the upper and lower platens in automatic balers.

The present invention is designed primarily for automatic wire baling. It is important to efficient operation of automated balers to maintain wire guide track alignment through multiple cycles of bailing. The moveable portion of the wire guide track must align well with the fixed portion of the wire guide track. If the fixed and moveable portions of the wire guide track do not align well, the wire will not follow the track and will not be properly positioned around the bale. This requires a halt in baling in order to repair and/or realign the wire guide track.

There are multiple causes for misalignment. Control system failure, hydraulic or pneumatic valve failure, hydraulic or pneumatic leaks in either the automatic baler or the compression mechanism can all cause misalignment. Moreover, it is not uncommon for the cotton or other bulk material to compress in a manner resulting in the horizontal surfaces of the material being non-level or non-horizontal. This causes the abutting platen to become misaligned. Furthermore, misalignment is known to be severe enough on occasion to actually cause a collision between the wire guide track and the platen at the time of insertion of the bulk material into the automatic baler. Such collisions damage the wire guide track or platen or both, and require repair.

Lost time for repairs or for realignment are consequential because baling operations such as cotton gins are subject to time constraints due to the seasonal nature of cotton harvesting and because unattended bulk cotton waiting for baling can be ruined by fermentation if not baled and distributed in a timely fashion.

Prior art automatic wire balers are designed to relatively close tolerances where the end of the fixed portion of the wire guide track meets the end of the moveable portion of the wire guide track. These close tolerances have been necessary to assure proper progression of the wire as it transits from the guide channel of one section to the channel of the next section. However, the close tolerances used in prior art guide tracks have not eliminated the incidence of small misalignments causing failures of wire to properly progress through the track. Close tolerances also increase the likelihood of a collision between the different sections of the guide track, or between portions of the guide track and the platens. Therefore, close tolerances increase the likelihood that misalignment or collision between elements of the automatic baler necessitate a halt in baling procedures for realignment or repair.

Prior art wire baling machines have been designed with no tolerance between the guide track sections; that is, the sections close together into a flush, abutting configuration, as in U.S. Pat. No. 5,031,523 patent and U.S. Pat. No. 3,470,813 patent. Where a wider tolerance has been built into a wire baling machine, as in U.S. Pat. No. 4,403,542 which does not incorporate the four guide track section layout of the present invention, an added-on bell requiring separate fabrication, has been used, see Lewis, U.S. Pat. No. 4,403,542 at Column 4, lines 29–41. Wider tolerances in metal or plastic band strapping devices, such as in U.S. Pat. No. 4,826,499 or U.S. Pat. No. 3,834,297, are acceptable because unguided strapping bands do not deviate from the desired path to the same degree or in the same manner as unguided wire. Accordingly, band strappers have been designed in two section configurations with wide tolerances and either with a wide aperture or bell, as in U.S. Pat. No. 5,826,499, or without it, as in U.S. Pat. No. 3,834,297. However, add-on bells are not workable in the present invention because they require more space than is available even in the wide tolerance configuration. Moreover, they complicate manufacture and construction issues and costs.

Wide tolerances between the ends of track sections have not previously been able to maintain reliable alignment of wire as it progresses from one track section to the next section. This is because the receiving section end aperture is only slightly wider than the wire channel, which is only slightly wider than the wire itself in prior art guide tracks. Unchanneled wire does not progress along a straight path, and consequently will miss a narrow receiving aperture across all but the narrowest gaps.

There is a need in the art to minimize collision, misalignment and the repairs they necessitate, as well as maintain or increase operational speed and reliability.

SUMMARY OF THE INVENTION

It is in view of the above problems that the present invention was developed. The invention is a wire guide track for a baling machine disposed in four operationally distinct sections, all with wide tolerances between one another and each incorporating a wide aperture track channel oriented to receive baling wire as it progresses through the track. More particularly, the wide aperture track channel includes one or more partitions thereby creating two or more receptacles for receiving the advancing baling wire. A lateral cross section of the bulk material to be baled will have a first and second vertical side and a top and bottom horizontal side. Four lengths of the wire guide track correspond approximately to each of the four sides of the bale. The wire is guided around the bale and into each of the successive track lengths by the four corners of the track. The wire guide track is divided into four sections; one fixed, one moveable and two more deployed in each of the upper and lower platens. The first fixed portion of the guide track is aligned along the first vertical side. The second vertical section of the guide track is aligned on the second vertical side of the bale, and is incorporated in a moveable frame to allow the guide track section and frame to move to a second, removed position, allowing ejection of the bale. Top and bottom horizontal sections of the guide track are aligned with the top and bottom horizontal sides of the bale and inside the platen channels. The bottom horizontal section is moveable in order to allow the bottom platen/following block assembly to compress the bale.

Each of the wire guide track sections incorporates the wide aperture oriented to receive the wire as it progresses along the track and around the bale. The wide aperture allows for wider tolerances between the articulating ends of the moveable and fixed guide track sections. The combination of the four operationally distinct sections with the wide aperture also allows for wider tolerances between the articulating faces of the different moveable guide track sections. Wider tolerances between the articulating ends of the guide track sections avoids collision between sections and between section and platens, thus reducing repair requirements and increasing reliability. The wide funnel-shaped aperture reduces the need for exact tolerances between articulating ends of the guide track sections, thereby helping to reduce the incidence of collision and also expanding the range of alignments between guide track sections through which the wire can pass in an operationally acceptable manner.

Each of the wire guide track sections also incorporates one or more partitions within the wide aperture. The partitions create receptacles to receive the advancing baling wire. The partitions are optimally shaped to guide the baling wire in a particular direction, such as above or below the partition and into the track channel. The partitions present the best of both worlds by creating narrow receptacles within a wide aperture such that the wide aperture allows for substantial misalignment while the narrow receptacles prevent baling wire progress failures.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention but are not intended to limit them. Together with the description, they serve to explain the principles of the invention. In the drawings.

DETAILED DESCRIPTION OF THE PREFERRED EMBODIMENTS

Figure 1:
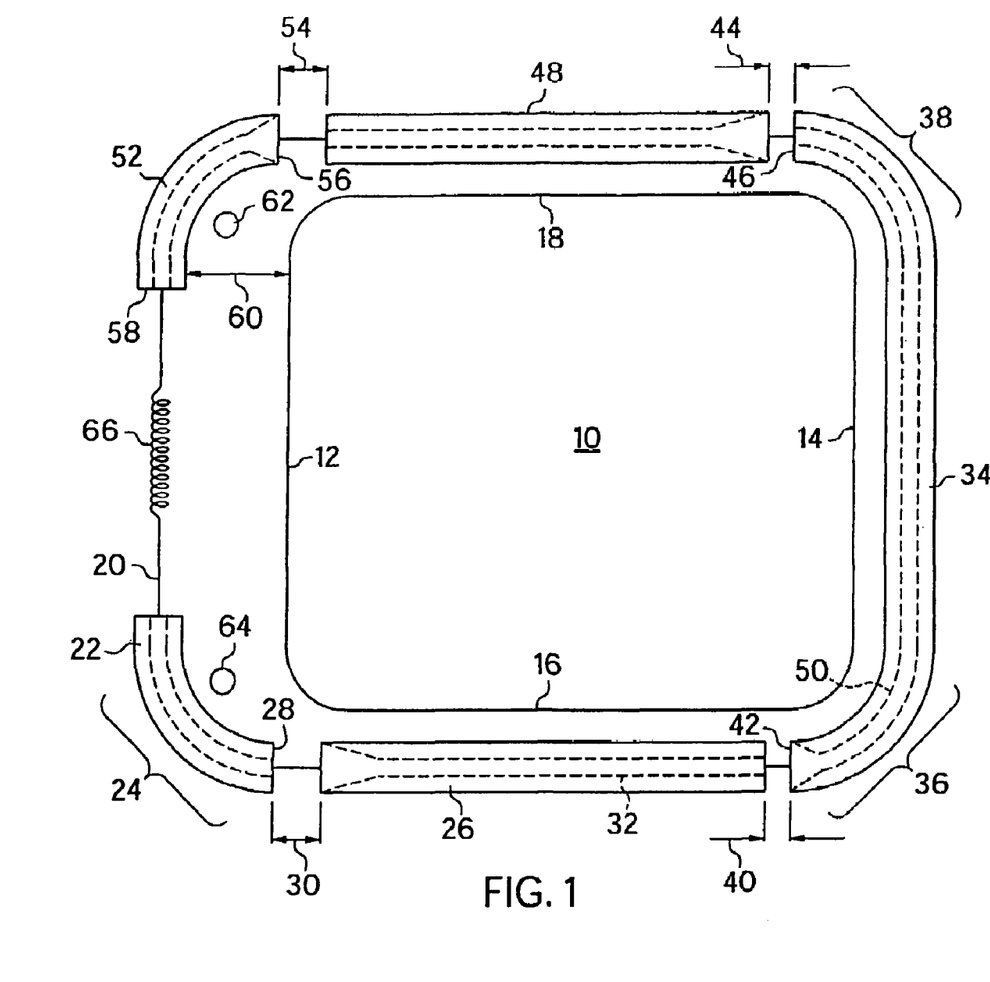
FIG. 1 is a side view of a cotton bale illustrating the baling wire track.

Referring to the accompanying drawings in which like reference numbers indicate like elements, FIG. 1 is a cross section of a cotton bale under compression, 10 surrounded by a guide track. The cotton bale will have a vertical first side, 12, a vertical opposite side, 14, a bottom side, 16, and a top side, 18. The baling wire, 20, is deployed by the automatic baling machine along a path beginning with wire feeder drive (not depicted) first in a downward direction parallel to the first vertical bale side, 12. The wire path is guided by the wire guide track. The wire feed drive propels the wire through a first fixed section of the wire guide track, 22, which redirects the wire progression through curve, 24, to a horizontal path parallel to the bottom of the cotton bale 16. A second straight section of the wire guide track, 26, parallels the bottom of the cotton bale 16. In the preferred embodiment this second section of the wire guide track is positioned within a channel under a lateral slot of the lower platen (not depicted). In previous embodiments, the second section had moved with the moveable section of track, and exited the lower platen channels to reach a bale ejection position. This configuration still had a deleterious incidence of collision.

The terminal end of the first fixed wire guide track section, 28, is separated from the initial, wire receiving end of the lower straight wire guide track section by a gap, 30. Broken lines, 32, within the lower straight wire guide track section indicate the track channel tapering out to the wide guide track aperture oriented to receive the progressing wire. A third, moveable section of the wire guide track, 34, receives the wire as it exits the second, straight lower guide track section and redirects the progressing wire along a second curve, 36, and then along straight section, 34, in an upwards vertical direction parallel to the opposing vertical side, 14, of the cotton bale. The third, moveable section of the wire guide track then redirects the progressing baling wire from an upwards vertical direction through curve, 38, to a horizontal direction parallel to the top of the bale, 18. There is a gap, 40, between the second, straight wire guide track section, 26, and the third wire guide track section, 34, receiving aperture, 42. There is another gap, 44, between the terminal end of the third wire guide track section, 46, and a fourth wire guide track section, 48. The broken lines, 50, illustrate the wide aperture of the third wire guide track section.

The entire third wire guide track section is mounted on a strut assembly (not depicted here) which pivots in order to rotate the strut assembly and third wire track section away from the cotton bale after binding to allow the bale to be expelled. The different positions of the third wire guide track section and structure assembly are depicted and described in relation to FIG. 4 below. The fourth wire guide track section, 48, is straight, about equivalent in length to the width of the cotton bale and parallel to the top of the cotton bale, 18. The fourth wire guide track section is inserted in a channel under the lateral slots of the upper platen (not depicted).

The progressing wire exits the fourth guide track section, 48, and is then received by an upper curved portion of the first fixed wire guide track section, 52, which receives the wire from the fourth straight, top wire guide track section, 48, through gap, 54, and into wide aperture, 56, and then redirects the wire in a downward vertical direction parallel with the cotton bales' first side, 12. The wire then exits the terminal end of the upper curved portion, 58, of the first fixed wire guide track section into a fastening header (not depicted). Tension is placed upon the wire, drawing it out of the wire guide track and into contact with the bale. A space, 60, exists between the knot and the first vertical side of the bale, 12. Tensioning pins, 62 and 64, are actuated by solenoids (not show) to extend into the plane of the bale wire loop, to prevent sharp bends in the wire, and maintain the proper length of the wire. The fastener automatically ties the leading end of the wire to the terminal end of the wire at knot, 66. After the ends of the wire have been knotted, the tensioning pins, 62 and 64, retract, the pressure on the cotton bale is released, and the consequent expansion of the bale draws the baling wire, 20, tight, eliminating space, 60.

Figure 2:
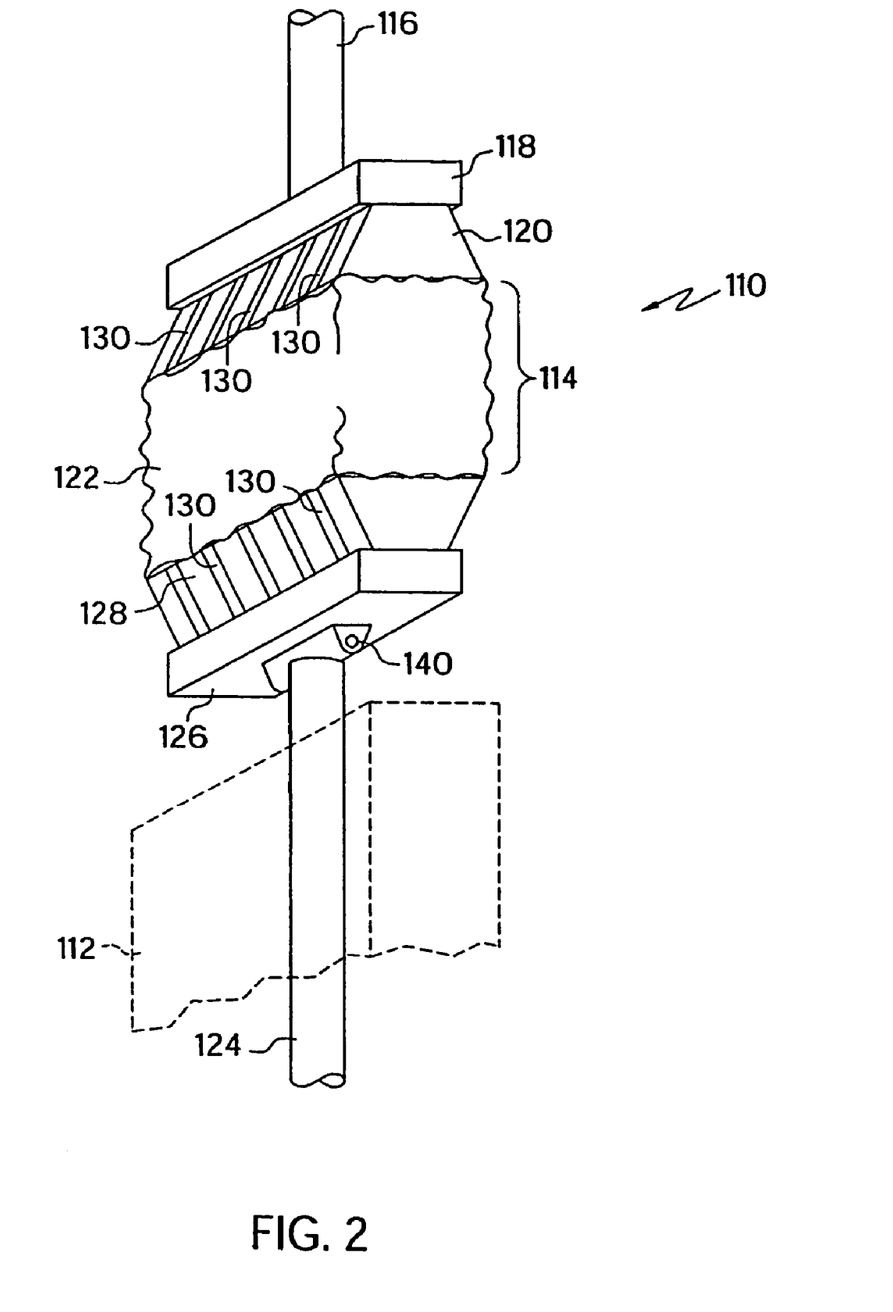
FIG. 2 is an oblique view of the cotton bale compression apparatus, illustrating platens in position for use.

FIG. 2 illustrates the cotton bale compression apparatus, 110. Bulk fibrous material operations, such as cotton gins, typically compress material in a vertical direction. The bulk fibrous material is first restrained from horizontal expansion within a compartment or "box," 112, shown by broken lines. This process forms a predetermined volume and/or weight of material into a rectangular form in a compression area either above or below the baling area. The formed but unbound bale of material is then moved to a baling station, 114, which movement is typically vertical. It is intended that all matter contained in this description and these illustrations shall be interpreted as illustrative rather than limiting. Thus, although typical fibrous bulk material compression operations are vertically aligned, with automatic balers being designed to work in conjunction with such configurations, the breadth and scope of the present invention should not be limited to only vertical compression systems, but would apply equally as well to horizontal or other directions of compression for fibrous bulk materials or other bulk materials.

FIG. 2 depicts a fixed upper shaft, 116, maintaining the position of an upper following block, 118, to which is attached an upper platen, 120. The upper platen arrests the upper progress of a bale of material, 122, and holds it during compression. A lower compression piston, 124, drives in an upward direction from the rectangular compression compartment a lower following block, 126, to which is attached a lower platen, 128, upon which rides the rectangular shaped, predetermined weight or volume of fibrous material, 122. The fibrous material, having been compressed once already in the compression compartment will, upon admission t the bale forming station (depicted below in FIG. 4) expand at first. The lower piston drives the fibrous material rectangle against the upper platen, 120, whereupon the material is compressed a second time into predetermined dimensions. When the predetermined dimensions are reached, the lower compression piston stops and the following blocks and platens hold the compressed bale of fibrous material in position for the automatic baler machine to wrap the wire around the bale and tie the wire.

Lateral slots in the upper platen, (not shown), allow for release of baling wire from a guide track to contact the bale. Lateral channels, 130 aligned with and behind the lateral slots allow insertion of wire guide track sections. In the preferred embodiment the guide track inserted into the lateral channels in the upper following block platen, 120, would be the fourth independent segment of the guide track (48 in FIG. 1). Likewise, the lateral slots, (not shown), of the lower platen, 128, allow for release of baling wire from the wire guide track to contact the bale. The wire guide track inserted below the lateral slots of the lower platen is the second independent section of the wire guide track (26 in FIG. 1), in the preferred embodiment.

Figure 3:
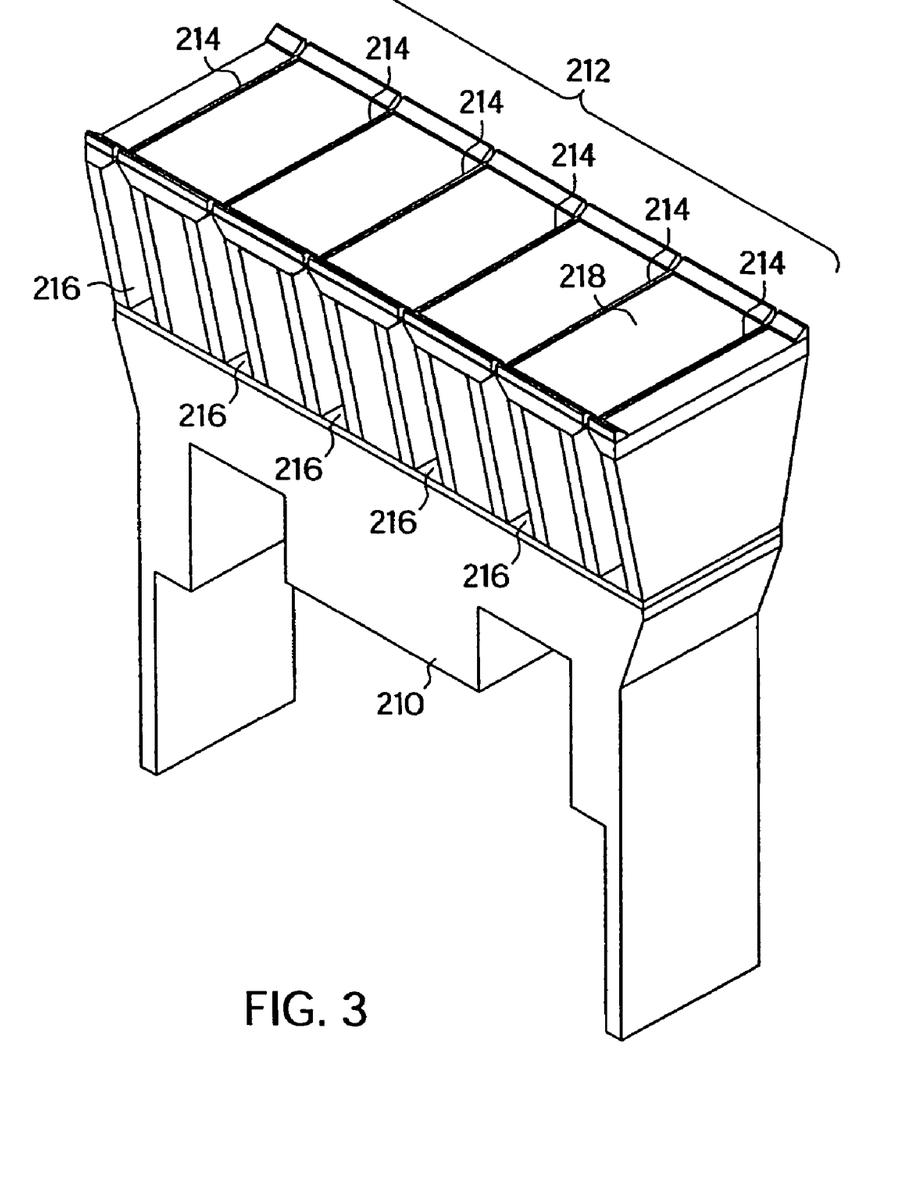
FIG. 3 is an oblique view of the following blocks and platens.

FIG. 3 is an oblique view of a following block, 210, and platen, 212, showing in greater detail the structure of the lateral slots, 214, and channels, 216. FIG. 3 illustrates the lateral channels' structure designed to receive the wire guide track. FIG. 3 also depicts the platen faces, 218, which come into contact with the compressed bulk fibrous material. On the platen faces can be seen the lateral slots, 214, through which the baling wire passes upon being released by the wire guide track (not depicted) inserted in the channels.

Figure 4:
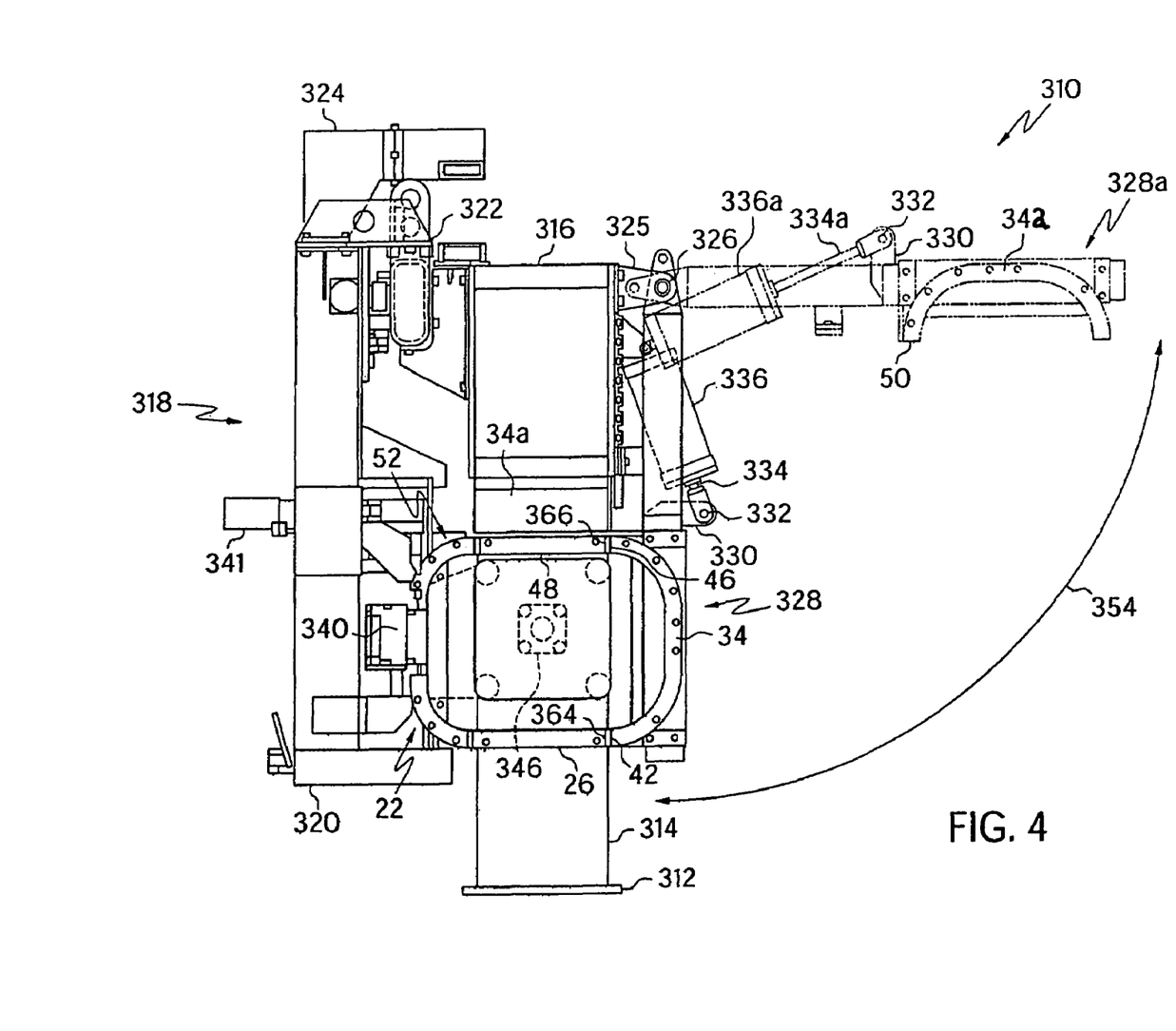
FIG. 4 is a side view of the automatic baling machine.

FIG. 4 illustrates a side view of the preferred embodiment of an automatic baler incorporating the present invention. The bale forming and binding apparatus, 310, has two positions; the solid lines illustrate a first position wherein a moveable wire guide track section support strut assembly, 328, complete the wire guide track trajectory when the binding operation is occurring; and the broken lines illustrate a second position wherein the moveable wire guide track support strut assembly is in a second position, 328*a*. The second position allows ejection of the bale from the bale forming station, 346.

A floor plate, 312, supports vertical support stands, 314, on either side of the bale-forming and binding station, 346. A binding assembly carriage, 318, is borne by stands, 314. The base extension, 320 of the carriage, 318, carries the fixed tying heads, 340, and attached fixed first section of the wire guide track, 22. In the depicted embodiment, the carriage, 318, translates in a direction perpendicular to the plane of the drawing along an overhead track, 322, attached to the upper rear extent of the stands, 314, whose motion is controlled by drive, 324.

Typically bulk fibrous material bales are bound with six baling wires. The depicted embodiment of the present invention has three wire guide tracks. The carriage translates in order that the three wire guide tracks may bind an individual bale six times by tying a first set of three wires, then translating, and tying a second set of three wires. In alternative embodiments of the present invention, the automatic baling machine carriage may contain six wire guide tracks, and thus not require translation in normal operation.

Extending from the upper forward extent of the stands, 314, are a pair of pivot axis brackets, 325, holding the pivot axes, 326, which carry the moveable guide tracks support strut assembly, 328. Extending forward from the center of the strut assembly, 328, is a member, 330, pivotally connected at pin, 332, to piston arm, 334, which is extended and withdrawn by action of the piston, 336. The action of the piston, 336, may be by any means but is preferably pneumatic. The binding wire entering the apparatus, 310, from the wire supply (not shown) at the wire feed drive, 341, is directed by guide track sections 22, 26, 34, 48 and 52, from and to the fastener head, 340, which fastens the wire into a closed loop, typically with a twist knot. The second wire guide track section, 26, lies in the channel within the lower platen (not shown) attached to the lower following block (not shown). The fourth wire guide track section, 48, lies in a channel within the upper platen below the upper following block (not shown).

The lower following block is actuated to compress the bulk material (not shown) by compression piston (shown in FIG. 2). The third, moveable wire guide track section, 34, is fixed to the moveable wire guide track section support strut, 328. The positions 328a, 34a, show the parts, 328, 34, at their respective positions when the moveable guide track section is removed from the bale-forming station, 346, for ejection of a bale. The moveable, third guide track section lower entry end, 42, and second guide track section terminus, 364, face one another in new cooperation when the moveable guide track section is lowered for operation. The upper fourth guide track section entry end, 366, and moveable third guide track section terminus, 46, face one another in near cooperation, to complete the wire guide track circuit when the wire guide track support strut, 328, is in the first position for baling. The arcuate line, 354, illustrates the path of motion of the lower terminus of the third moveable guide track section it transits between positions. The third moveable guide track section, 34, has an upper curve, and a lower curve, both of approximately 90 degrees and, in a preferred embodiment, possessing radii of curvature of approximately six inches and seven inches respectively.

Figure 5:
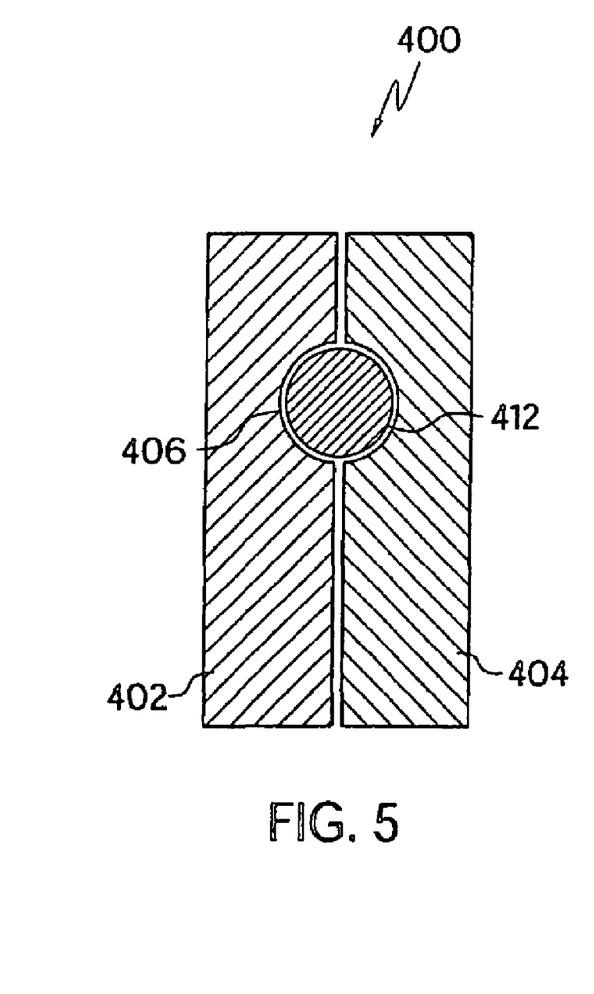
FIG. 5 is a cross section of the wire guide track in a closed position.

FIG. 5 depicts a cross sectional view of the wire guide track, 400, construction in a closed state for the directing of the wire, 412, about the bale. The first longitudinal half, 402, and second longitudinal half of the track, 404, are separable, and are shown as closed thereby forming the channel, 406. The first longitudinal half 402 and the second longitudinal half 404 are biased together by a releasable pressure applicator (not shown). Those skilled in the art would understand that the releasable pressure applicator may be comprised of springs, pneumatic pressure means, hydraulic pressure means, solenoids, electro-servo motors, or similar means of biasing together the two track halves.

Figure 6:
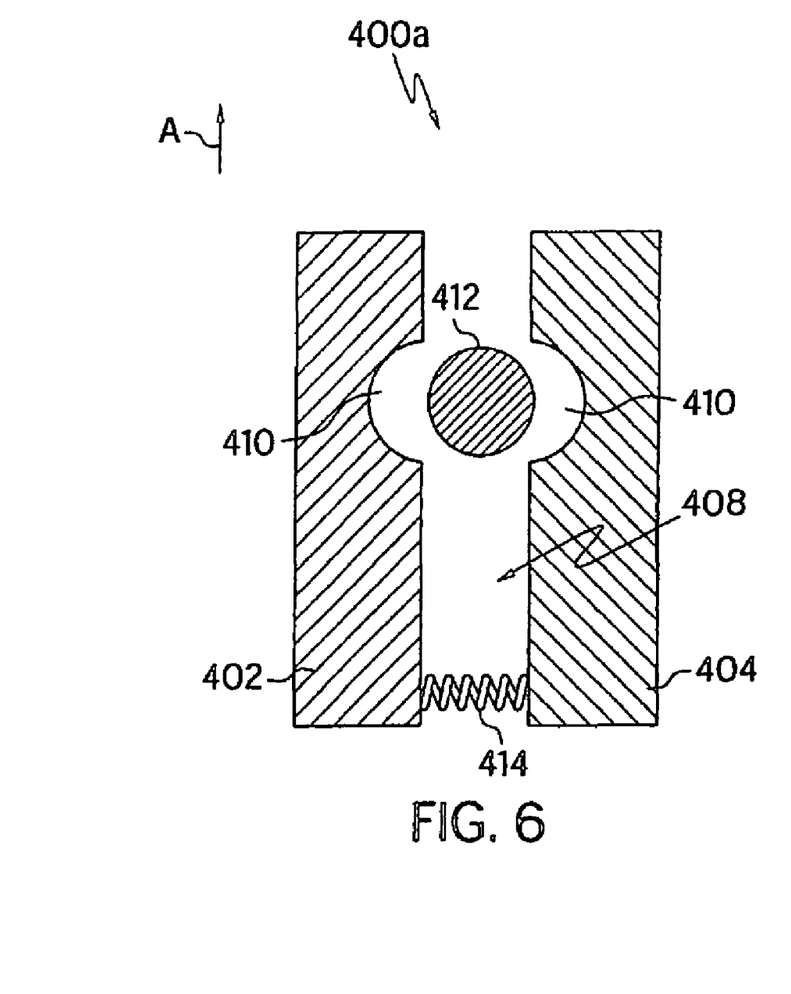
FIG. 6 is a cross section of the wire guide track in an open position.

FIG. 6 depicts a cross sectional view of the wire guide track, 400a, construction in an open state for the releasing during fastening of a closed loop of the wire, 412, in the direction shown by the arrow, A, towards the compressed bale (not depicted) from between the halves, 402, and 404, now separated to release the wire through the open gap, 408, between them. Grooves, 410, combine to form the two sides of a channel, 406, when in the closed position. Spring means, 414, mediate the transition of the track between the closed and open positions.

In operation as depicted in FIG. 4, when the movable wire guide track support strut assembly, 328, is down, the binding wire enters the apparatus from the wire supply (not shown) at the wire feed drive, 341, and enters the fastener head 340. Drive wheels rotate to push wire frictionally through the fastening head, 340, downwards to the first guide track section, 22, and across, up, back and then down the other guide track sections, 26, 34, 48 and 52, and then back into fastening head, 340, until the end of the wire actuates a limit switch (not shown). The wire thus forms a loop with an overlapping wire portion location within fastening head, 340. It is preferred to use #10 gauge wire that is sold by U.S. Wire under the trade name ULTRA STRAP GALVANIZED.

At this point, tensioning pins (62 and 64, FIG. 1) are extended. The tying head twists the wire into a knot. In order to effect tying, tension is placed on the wire by reversing the drive wheels. This tension pulls the wire out from between the two halves, 402 and 404, of the wire guide track as shown by the releasing action in FIGS. 5 and 6. As the wire is tensioned and breaks out of the channel, 406, the wire is pulled tight around the bale and also around tensioning pins, 62, and 64, respectively.

Once the tying head has completed the twist knot, tensioning pins, 62 and 64, are retracted by a solenoid (not shown) until they are out of contact with the wire.

Then, in the instant embodiment, carriage, 318, FIG. 4, can translate to a second index position along overhead track 322. Wire is again drawn by feed drive, 341, to push the wire in a loop through all four guide track sections and back into the fastener head, 340. Then the twist knot process repeats.

For cotton bales, six baling wires are used to bind a 500 pound standard density bale of cotton. Thus, if three indexing heads are mounted to carriage, 318, the carriage, 318, must index between a first position and a second position to provide six baling wires. Alternative embodiments include automatic baling machines with six indexing heads, six wire guide tracks and six tying heads, which would obviate the need for the carriage to translate in normal operation.

Figure 7:
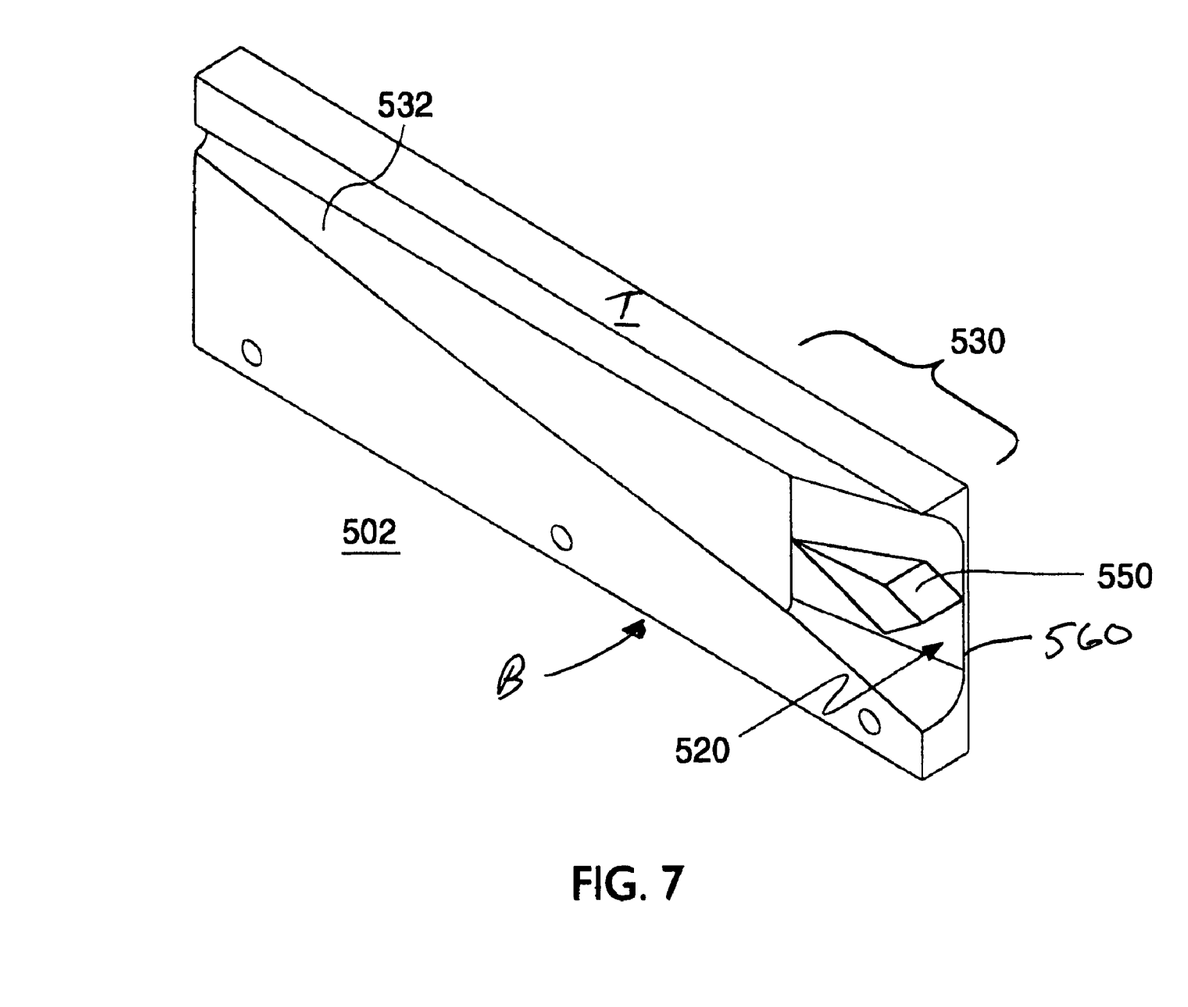
FIG. 7 depicts a side view of one-half of the straight second wire guide track section.
Figure 8:
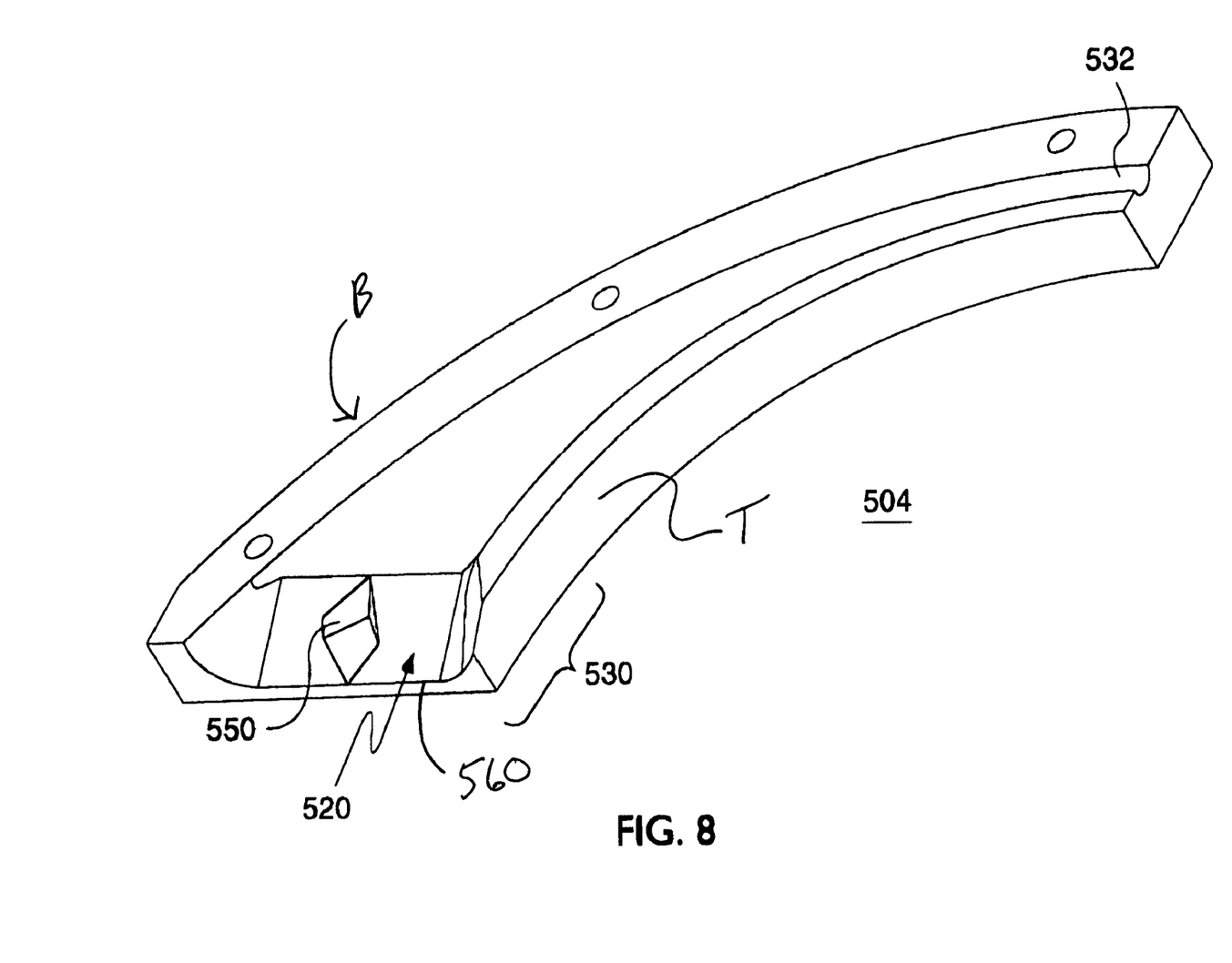
FIG. 8 depicts one-half of the curved portion of third wire guide track section.
Figure 9:
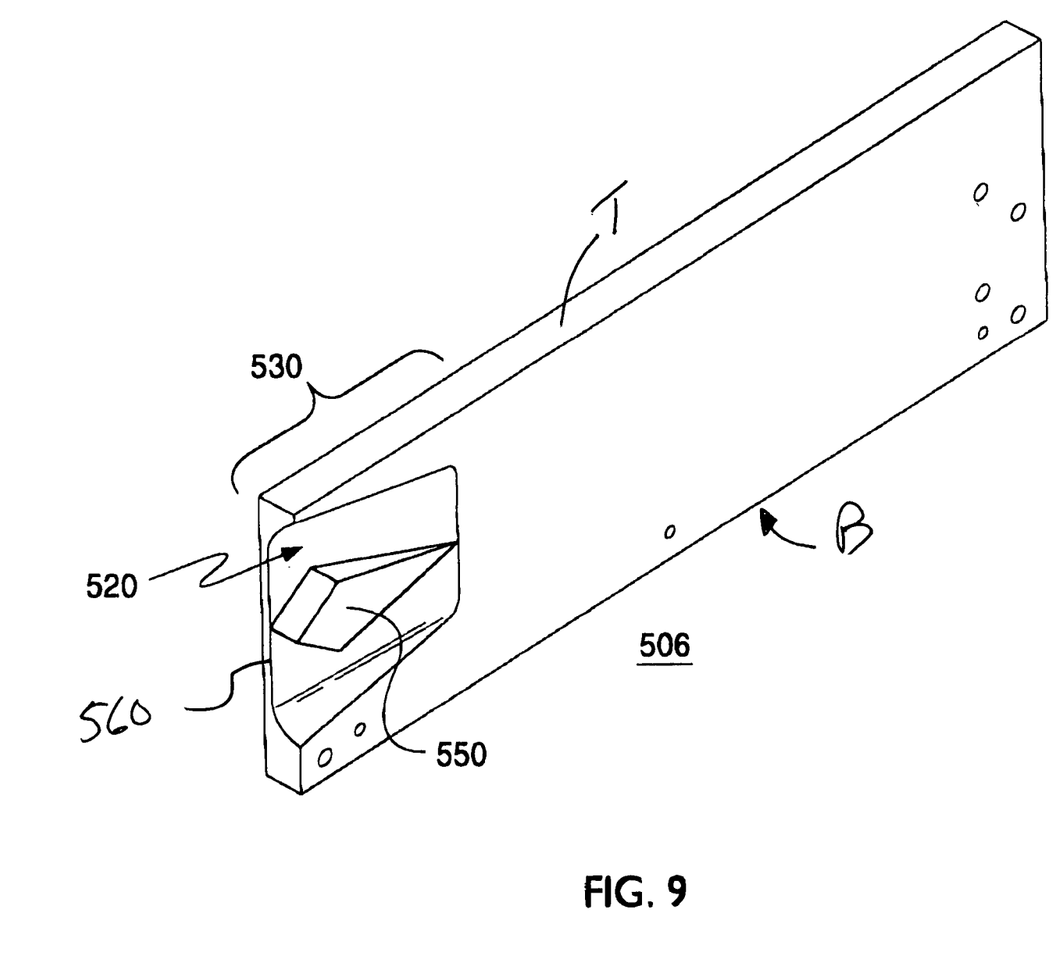
FIG. 9 depicts the other half of the straight second wire guide track section in the truncated version.
Figure 10:
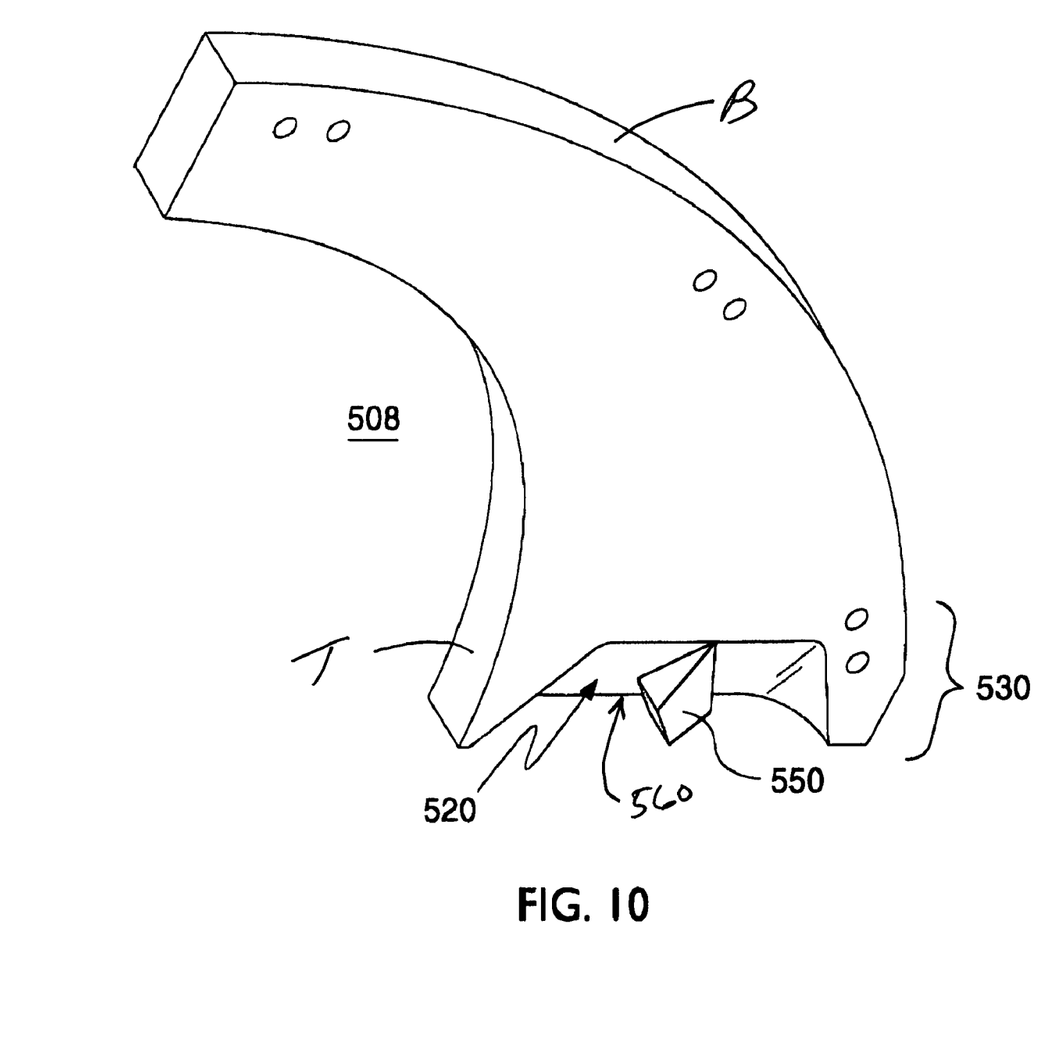
FIG. 10 depicts the other half of the curved portion of third wire guide track section in the truncated version.

FIG. 7 depicts an oblique view of one-half, 502, of the straight wire guide track of either section, 26 or 48. FIG. 8 depicts one-half, 504, of the curved portion of either wire guide track of section 22 or 52. FIG. 9 depicts the other half, 506, of the straight wire guide track of either section 26 or 48, in the truncated version. FIG. 10 depicts the other half, 508, of the curved portion of either wire guide track section 22 or 52, in the truncated version. The hollow grooves, 532, on the inside surfaces of wire guide track halves, 502 and 504, when enclosed together by closing the facing halves of wire guide track sections, 506 and 508, together, form the wire guide track channel to guide the baling wire along the proper path around the bale. The tapered grooves, 532, of the present invention correspond to the grooves, 410, in FIGS. 5 and 6, which illustrate the releasing action used in any guide track, with or without the present invention.

The wide apertures, 520, are oriented to receive the leading edge of the baling wire as it progresses around the bale through the wire guide track sections. The wide aperture in the receiving end of the wire guide track is substantially wide enough that the wire guide track may continue to properly guide the wire around the bale in the event of misalignment of wire guide track section ends with one another. The amount of wire misalignment which is accommodated by the wide aperture is enough to allow for a wide gap between track section ends.

The taper, 530, between the aperture and the hollow groove, 532, is designed to narrow quickly enough so that either #10 or #11 gauge baling wire will not curl, fold over upon itself or jam as it progresses into the next guide track section. The most preferred dimensions are substantially a widening ratio of about 1.56:1 vertically and 1.33:1 horizontally. The most preferred embodiment, by way of example and not limitation, begins at an aperture width of 3.75" and tapering to a channel width of 2.4". The angle of increase is about 22" vertically and 18" horizontally. Via curve or hard chine, equivalently, this tapering ratio may change to about 9° vertically and 0° horizontally, or about 1.14:1 vertically, over the rest of the length of the guide track channel. Alternatively and equivalently, the taper may run the length of the guide track section with a smooth change in angle or no change in angle. In the most preferred embodiment, the exit channel is 0.312 inches wide.

At these dimensions, the preferred embodiment is capable of maintaining a desired gap between guide track sections of two to four inches. Smaller gaps are still beneficial and enabled by the present invention. Alternative embodiments would equivalently bridge operative gaps in excess of four inches.

FIGS. 7–10 also illustrate a partition 550 for creating multiple receptacles within the wide aperture 520 for receiving wire. The partition 550 is operatively connected to the inside face of one-half of the wire guide track. In some embodiments, each wire guide track section half includes the partition 550. The partition 550 is preferably connected to the wire guide track through the use of bolts or screws, but may be attached by other means, such as by welding. The partition 550 can have various shapes and only one possible shape is shown. The partition is optimally shaped to guide the progressing wire either upwardly or downwardly such that wire enters the wide aperture 520, the progressing wire is directed above or below the partition 550, and the wire is guided into the tapered groove 532. In some embodiments, there may be more than one partition. As can be seen in the drawing figures, each track section half has a top T and a bottom B opposite the top, and the partition 550 is located intermediate the top T and the bottom B. Moreover, as can be seen in FIGS. 7–10, the partition 550 is centrally located within the wide aperture 520 and extends from a leading edge 560.

Alternative embodiments of the present invention would include either both halves of the wire guide track having wide aperture to groove tapers as depicted in FIGS. 7 and 9. Where both cooperating halves are channeled, they are designed as mirror images to correspond with one another. Alternatively, a truncated funnel for one of the two guide track halves, as depicted in FIGS. 9 and 10, is designed simply to receive the baling wire as it progresses from the prior wire guide track section. In this embodiment, tapered groove, 532, in the first half of the wire guide track sections, 502 and 504, as depicted in FIGS. 7 and 8, is sufficient to guide the wire.

The term "strap" is a recognized industry term of art understood by those with skill in the art to mean generically wire, metal bands, plastic bands or other types of straps. The preferred embodiment of the present invention uses "straps" that are wire, most preferably 10-gauge wire. Those with skill in the art will understand from the use of the term "strap" that the scope of the present invention applies equivalently to both wire, metal bands, plastic bands and any other kind of binding strap used in bulk material baling.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A baling wire guide track section comprising:
   a guide track section having a receiving end oriented to receive a progressing baling wire from a predetermined direction and an exit end oriented to direct said wire along a predetermined trajectory, said guide track section having a top and a bottom;
   a longitudinal channel running substantially the length of said wire guide track section for guiding the wire, said channel having a receiving aperture and an exit aperture, and said receiving aperture being wider than said exit aperture in at least one dimension; and
   at least one static partition centrally positioned within said receiving aperture of said longitudinal channel in between said top and said bottom and extending from a leading edge of said receiving aperture.

2. The apparatus of claim 1 wherein said guide track section comprises a first section half and a second section half, said first section half and said second section half being biased together to hold said wire in said channel.

3. The apparatus of claim 1 wherein said channel is dimensioned to prevent baling wire progress failures selected from the group consisting of: folding, curling and jamming.

4. The apparatus of claim 1 wherein said at least one partition is located within said receiving aperture to prevent bailing wire progress failures selected from the group consisting of: folding, curling and jamming.

5. A baling wire guide track section comprising:
   a first guide track section half with an inside longitudinal face and having a wire receiving end and a wire exit end;
   a second guide track section half with an inside longitudinal face oriented to oppose said inside longitudinal face of said first guide track section half and also having a wire receiving end and a wire exit end;
   said longitudinal faces of said first and second wire guide track section halves biased together;
   a convexity disposed in said inside longitudinal face of at least one of said guide track section halves, said convexity extending substantially the entire length of said at least one guide track section half from said wire receiving end to said wire exit end, said convexity being dimensioned to form a guide channel between said guide track section halves when said guide track section halves are biased together, said channel being aligned to control the direction of a baling wire progressing through said channel;
   a widening of said convexity, said convexity tapering from said guide channel to a wide aperture at said wire receiving end of said at least one guide track section half, said aperture being oriented to receive a progressing baling wire; and
   a partition operatively connected to said inside longitudinal face of at least one of said guide track section halves, said partition centrally positioned within said wide aperture in between a top and a bottom of said at least one guide track section half, and said partition extending from a leading edge of said wide aperture.

6. The apparatus of claim 5 wherein said widening is dimensioned to prevent baling wire progress failures from the group consisting of: folding, curling or jamming.

7. The apparatus of claim 5 wherein said first and second guide track section halves are curved.

8. The apparatus of claim 7 wherein said first and second guide track section halves are curved such that said wire receiving end of said first and second guide track section halves is at a 90 degree angle to said exit ends of said first and second wire guide track section halves.

9. The apparatus of claim 5 wherein the baling wire guide track section includes at least two partitions.

10. The apparatus of claim 5 wherein said partition is located to prevent baling wire progress failures from the group consisting of: folding, curling or jamming.

11. The apparatus of claim 5 wherein said curved first and second guide track section halves are curved around a radius of about six to seven inches.

12. A baling wire guide track section comprising:
a first fixed section of guide track having a first and a second track section longitudinal half, an exit end, and a receiving end, each track section half including an inside face, said exit end of said track section being oriented to direct a progressing baling wire in a predetermined trajectory, and the receiving end of said track being oriented to receive the progressing baling wire from a predetermined direction;
a second moveable section of guide track having a first and a second track section longitudinal half, an exit end, a receiving end, each track section half including an inside face, said exit end of said second moveable section of guide track being oriented to direct the progressing baling wire along said predetermined trajectory, and the receiving end of said second moveable section of guide track being oriented to receive the progressing baling wire from a predetermined direction;
a third moveable section of guide track having a first and a second track section longitudinal half, an exit end, and a receiving end, each track section half including an inside face, said exit end of said third moveable guide track section being oriented to direct the progressing baling wire along said predetermined trajectory, and said receiving end of said third moveable guide track section being oriented to receive said progressing baling wire from a predetermined direction;
a fourth moveable section of guide track having of a first and a second track section longitudinal half, an exit end, and a receiving end, each track section half including an inside face, said exit end of said fourth moveable guide track section being oriented to direct the progressing baling wire along said predetermined trajectory and said receiving end of said fourth moveable guide track section being oriented to receive the progressing baling wire from a predetermined direction;
a convexity in at least one longitudinal half of each of said guide track sections, said convexities extending substantially the entire length of each of said guide track sections from each of said receiving ends to each of said exit ends of each of said guide track sections, said convexity being dimensioned to form a channel between each of said guide track section halves when each of said wire guide track section halves are biased together, said channel being dimensioned to control said trajectory of said baling wire progressing through said channel;
a widening of said convexity tapering to at least one of said channels from a wide aperture in at least one of said receiving ends of at least one of said guide track sections, said at least one wide aperture being wider than said channel in at least one dimension; and
a partition operatively connected to said inside longitudinal face of at least one of said guide track section halves, said partition centrally positioned within said at least one wide aperture in between a top and a bottom of said at least one guide track section, and said partition extending from a leading edge of said at least one wide aperture.

13. The apparatus of claim 12 wherein two of said guide track sections are curved and two of said guide track sections are substantially straight.

14. The apparatus of claim 13 wherein said first and third wire guide track sections are curved and said second and fourth sections are substantially straight.

15. The apparatus of claim 12 wherein said first and third wire guide track section halves are curved such that said wire receiving ends of said first and third wire guide track sections are at a 180 degree angle with respect to said exit ends of said first and third wire guide track sections.

16. The apparatus of claim 15 wherein said first and third wire guide track section halves are curved such that said wire receiving ends of said first and third wire guide track sections are at a 180 degree angle with respect to said exit ends of said first and third wire guide track sections, and wherein said second and fourth wire guide track sections are substantially straight.

17. The apparatus of claim 12 wherein said tapering of said convexity is dimensioned to prevent baling wire progress failures from the group consisting of: folding, curling or jamming.

18. The apparatus of claim 12 wherein said convexity in at least one of said second wire guide track section longitudinal halves is truncated.

19. The apparatus of claim 12 wherein the baling wire guide track section includes at least two partitions.

20. The apparatus of claim 12 wherein a distance between an exit end of any of said sections of guide track and an adjacent receiving end of any next of said sections of guide track is greater than 1 centimeter.

* * * * *